(12) United States Patent
Adams

(10) Patent No.: US 7,747,452 B1
(45) Date of Patent: *Jun. 29, 2010

(54) ENFORCEMENT PROCESS FOR CORRECTION OF HARDWARE AND SOFTWARE DEFECTS

(76) Inventor: Phillip M. Adams, 313 Pleasant Summit Dr., Henderson, NV (US) 89012

( * ) Notice: Subject to any disclaimer, the term of this patent is extended or adjusted under 35 U.S.C. 154(b) by 2 days.

This patent is subject to a terminal disclaimer.

(21) Appl. No.: 12/106,958

(22) Filed: Apr. 21, 2008

Related U.S. Application Data

(63) Continuation of application No. 10/727,366, filed on Dec. 4, 2003, now Pat. No. 7,363,237, which is a continuation of application No. 10/374,215, filed on Feb. 25, 2003, now abandoned.

(60) Provisional application No. 60/437,447, filed on Dec. 31, 2002.

(51) Int. Cl.
 *G06Q 10/00* (2006.01)
(52) U.S. Cl. ...................................................... 705/1.1
(58) Field of Classification Search .................... 705/1,
 705/7–11, 51, 53, 14, 26, 30, 500, 1.1; 714/37,
 714/38, 32, 27, 25, 1, 100; 717/124, 168–173;
 713/1, 100; 712/38, E9.035; 726/26, 33;
 718/102; 719/328
 See application file for complete search history.

(56) References Cited

U.S. PATENT DOCUMENTS

| 5,113,518 A | * | 5/1992 | Durst et al. .................... 726/29 |
| 5,379,414 A | | 1/1995 | Adams |
| 5,430,878 A | * | 7/1995 | Straub et al. ................. 717/162 |

(Continued)

FOREIGN PATENT DOCUMENTS

EP 1107117 A2 6/2001

(Continued)

OTHER PUBLICATIONS

In Press, Software AQ Magainze, Sep. 1998; Liability for Product Incompatibility.

(Continued)

*Primary Examiner*—Igor Borissov
(74) *Attorney, Agent, or Firm*—Pate Pierce & Baird

(57) ABSTRACT

A method and apparatus for improvement of computer-related products to solve problems caused by artificially embedded locks, barriers, defects, and the like, that force a consumer to needlessly upgrade hardware or software on a computer. An independent developer may procure access to a product, develop a testing regimen for functionality of the product, and perform evaluations to identify sources of any operational defects found. Accordingly, the developer may then provide a generalized testing regimen to test instances of product provided by a supplier, identify those containing the flaw, and may optionally provide a solution to the flaw, where practicable. The independent developer may obtain intellectual property rights in the testing, solution or both for the product. Thus, by notifying a supplier, an independent developer may become a supplier of testing or solution systems, motivating a supplier by one of several mechanisms. The developer may obtain a legal status with respect to the supplier by becoming a customer or user, in order to provide motivation to a recalcitrant supplier not designed to take responsibility for defects known and continued in marketed products.

14 Claims, 11 Drawing Sheets

U.S. PATENT DOCUMENTS

| | | | | |
|---|---|---|---|---|
| 5,577,232 | A | * | 11/1996 | Priem et al. ............... 717/170 |
| 5,671,435 | A | * | 9/1997 | Alpert ...................... 712/38 |
| 5,701,442 | A | * | 12/1997 | Ronen ...................... 712/37 |
| 6,009,261 | A | * | 12/1999 | Scalzi et al. ............... 703/26 |
| 6,074,435 | A | * | 6/2000 | Rojestål .................. 717/173 |
| 6,321,348 | B1 | | 11/2001 | Kobata |
| 6,484,309 | B2 | * | 11/2002 | Nowlin et al. ............. 717/100 |
| 6,490,721 | B1 | * | 12/2002 | Gorshkov et al. .......... 717/130 |
| 6,557,118 | B2 | | 4/2003 | Schleiss et al. |
| 6,675,295 | B1 | | 1/2004 | Marcelais et al. |
| 6,708,291 | B1 | | 3/2004 | Kidder |
| 6,745,385 | B1 | * | 6/2004 | Lupu et al. ............... 717/163 |
| 7,032,213 | B1 | * | 4/2006 | Lupu et al. ............... 717/129 |
| 7,055,148 | B2 | | 5/2006 | Marsh et al. |
| 7,085,936 | B1 | | 8/2006 | Moran |
| 7,191,435 | B2 | * | 3/2007 | Lau et al. ................. 717/168 |
| 2002/0073398 | A1 | * | 6/2002 | Tinker ..................... 717/110 |
| 2003/0056151 | A1 | | 3/2003 | Makiyama |
| 2003/0233493 | A1 | | 12/2003 | Boldon et al. |
| 2004/0128583 | A1 | | 7/2004 | Iulo et al. |
| 2005/0015678 | A1 | | 1/2005 | Miller |

FOREIGN PATENT DOCUMENTS

| | | |
|---|---|---|
| GB | 2361787 A | 10/2001 |
| JP | 11282664 A | 10/1999 |

OTHER PUBLICATIONS

Iomega, Class Act or Class Action? A Continuing Study Into How Iomega Treats Its Customers and Employees.

Broersman; Squeeze Linux into Xbox, win $200,000; http://news.com.com/2100-1040-941298,html; 3 pages.

Zisman, Alan; Running Old DOS games in Windows 95; 1997; http://www.zisman.ca/ARticles/1997/DOSgames.html; 3 pages.

* cited by examiner

ENFORCEMENT PROCESS FOR CORRECTION OF HARDWARE AND SOFTWARE DEFECTS

RELATED APPLICATIONS

This application is a continuation of U.S. patent application Ser. No. 10/727,366 filed Dec. 4, 2003 which is a continuation of U.S. patent application Ser. No. 10/374,215 filed Feb. 25, 2003 which claims the benefit of 60/437,447 filed Dec. 31, 2002.

BACKGROUND

1. The Field of the Invention

This invention relates to computerized methods for testing and tracking and, more particularly, to novel systems and methods for testing, tracking, and correcting defects in software or hardware systems arising from faulty programming, faulty manufacture, inappropriate and invasive programming, or artificially forced obsolescence of computer system hardware and software.

2. Background

Product development cycles have become shorter and shorter. More of the responsibility for testing and "debugging" products falls to the actual beta testers or alpha testers. Nevertheless, products are continuing their development cycle well into their marketing bases.

For example, software is often released for public purchase before the known errors from beta testing have been cured. Hardware is often likewise premature, and more difficult to correct. Alternatively, beta testing may be inadequate, leaving various problems extant within either hardware, software, or a combination thereof.

Purchasers are often left with a need for identification and cure of errors in commercially available software and hardware. In some instances, product manufacturers and suppliers actively solicit comments, improvements, detection and identification of errors, and the like. In other situations, manufacturers and marketers of products are not so forthcoming. For example, occasionally, problems are comparatively esoteric, and may occur only in a few rare conditions or instances. Nevertheless, some errors occur with sufficient regularity as to seriously encumber users unaware of the existence of such product flaws.

In recent years, computer and software manufacturers have been repeatedly surprised, even amazed, at the groundswell of opposition to products that are not adequately tested, supported, corrected, recalled, or otherwise identified as having correctable flaws.

Software, in particular, has arrived at a new threshold of pain for purchasers and users. Never since the advent of government agencies for consumer protection against fraud, product failure, product inadequacy, manufacturer non-responsiveness, and the like, have so many dollars of product value been subject to such massive amounts of owner and operator time in order to obtain the purported benefits of the products.

Some manufacturers are swift to seek out and post notification of errors existing in their products. Typically, errors are identified, with associated patches for correcting the errors. In some cases, products are recalled. With the advent of the world wide web, a host of users may provide a corresponding host of error corrections, all freely available to users interested in improving the performance or reliability of a purchased software or hardware product in the computer industry.

Historically, a manufacturer or other purveyor of a computer-related product may face a dilemma with respect to certain product flaws. To the extent that an error, built into or programmed into a computer-related product, is comparatively esoteric and unlikely to cause problems for the majority of users, a manufacturer or developer may prefer to ignore it. To the extent that such a flaw or error is ubiquitous and likely to cause pervasive and obvious problems, a manufacturer may prefer to cure the problem. Similarly, to the extent that a problem is likely to cause a comparatively small disruption of promised service, a manufacturer may choose to ignore it. Alternatively, to the extent that a problem is likely to cause serious economic damages to a commercial or industrial user of a software product or physical damage to persons or property as a direct result of the failure of a computer-based product, a manufacturer will take appropriate steps to find a correction to the problem, announce the presence of the flaw and the availability of a corrective measure, and seek to bring all copies of the product into compliance with a corrected version thereof.

Nevertheless, product improvement is largely a matter of motivation. Motivation may arise from personal interest, individual or enterprise-wide frustration, desirability of a result, previous experiences and expectations, and the like. In current process for product improvement, little incentive exists to provide for skilled third parties to improve marketed products. By the same token, manufacturers, whether large or small, may have limited motivation, resources, or the like to locate and correct errors. In fact, a certain motivation may exist to not seek out errors, nor to highlight them, nor even to repair them, in many instances.

What is needed is a mechanism, whereby software and hardware products related to computer systems may be improved profitably by third parties. Likewise, what is needed is an apparatus and method for consistently providing the necessary resources for testing, correction, notification, and product redistribution for products and upgrades related to computer-related based products, whether software or hardware.

Other difficulties with software originate from purveyors and producers of "invasive software". Invasive software typically provides various opportunities for the developers or sellers of software to obtain information from a computer of a user. For example, "cookies" are commonly understood data structures that hold certain user identification information that may be useful to a software supplier. The proliferation of cookies has become epidemic. Many users are unaware of the number of cookies being used by software and relied upon by software vendors. Likewise, users are less aware of the frequent Internet contacts made to transfer information from cookies back to central computers owned by parties other than the software users.

New licensing language in certain software actually requests of users to provide sweeping authorization for software providers to install over the Internet certain software extraneous to the principal offer of purchase. The software license asks consent for the purpose of collecting whatever information the seller or manufacturer chooses. These various types of invasive software may include reporters that report information back that users may not be aware is being reported back. Moreover, such software installation done extraneously to the basic software installation may even be as aggressive as moles that execute searching functions to determine information on the user's computer in order to report that information back to the software installer, vendor, or producer.

Moreover, many professional organizations such as corporations, government bodies, government regulatory agencies, administrative agencies, educational organizations, health maintenance organizations, medical practices, insurance companies, financial institutions, law offices, and the like, maintain, as a matter of course, extremely sensitive, proprietary, and confidential information. That information is not properly disclosed to third parties.

Third-party software installations or licenses request of a software user the broad sweeping right to install cookies, reporters, or moles. Such installations may be imposed over the Internet, or from installation software initially, and the confidential information of clients and customers may thus be compromised. A software user may therefore be liable for the breach of confidentiality. Meanwhile, the software originally installed, which may have given rise to the subsequent or concurrent installation of spurious invasive software, has breached and caused the software user to breach duties to clients and customers.

A system and method are needed to remedy these breaches, and to hold accountable those who perpetrate through form contracts and licenses broad, overreaching purported rights to install invasive software on the system of a user and to obtain thereby confidential information of the user or customer and clients of a user.

Other difficulties may arise when a manufacturer or other entity artificially forces obsolescence on selected computer hardware components, thereby forcing a consumer to needlessly upgrade to newer components. For example, a CPU, also known as a processor, is the processing center of a computer system. A check CPU may be designed with a collection of machine language instructions, or instruction set, that the processor understands and follows. Program code, developed to perform a desired task, must ultimately perform its various functions and routines using the instruction set of the processor on which it is processed. As CPU manufacturers, such as Intel, have released newer and faster processor architectures, one hallmark of their evolution and design has been backward compatibility, meaning that newer chips will execute the instruction set of previous processors. However, program code written for newer architectures may not run on the older processors, since new instructions may be utilized. In some cases, the instruction set of a new CPU architecture may only include a few new instructions as compared to its predecessor.

For example, the Intel 80486 (the 486) processor architecture added 6 new instructions to extend its Intel 80386 (the 386) instruction set core. Likewise, the Intel Pentium added 8 new instructions to its 486 instruction set core. In some cases, software may utilize the new instructions, and therefore, not run on older processors. These new instructions, if encountered by an older processor, may incur errors in the operation thereof, and may cause a system shutdown or the like.

As new instructions are added, some software may check the characteristics, such as clock speed, architecture, and the like, of the processor on which it is running. Certain instructions, when executed, simply identify selected characteristics of the processor. These characteristics may be used like flags by the software to decide whether to proceed with execution or to modify execution in some way. For example, the CPUID instruction, introduced to the core instruction set in upgraded processors, may return the values of certain characteristics of a given processor. Some processors may not support this instruction and incur errors when encountered thereby.

Installation programs, used to install many software applications, may check the characteristics of a processor and require that a computer meet a pre-selected set of requirements. For example, a purchased software package may state on its packaging a minimum CPU architecture, clock speed, RAM requirements, and secondary storage (disk capacity) requirements to operate the software. If these minimum system requirements are not met, the installation program may abort the installation process and prevent a user from installing the desired software.

Some software manufacturers may justify this action in order to ensure that a software package performs at what the manufacturer considers a satisfactory level. Unfortunately, some requirements may be artificially imposed. That is, a program may actually run at a satisfactory performance level, as deemed by a user of a computer system, but the user may be prevented from installing and running the software because the manufacturer has artificially locked out selected computer systems. In a sense, the manufacturer of the software has forced obsolescence of the computer system, as in the case of Microsoft and the Windows operating system. This may require a user to unnecessarily upgrade or purchase a new computer system, satisfying the requirements, incurring unneeded frustration, effort, collateral programming, and expense to the user.

In accordance with the issues and problems described hereinbefore, what is needed is a software solution, whereby an older processor may emulate a newer processor's extended features without incurring a significant performance penalty, thereby eliminating the need to unnecessarily upgrade to a newer processor or computer system to host newer operating systems and software.

Alternatively, in cases where hardware-dependent software locks artificially prevent the installation of software, thereby needlessly forcing obsolescence on selected hardware components, what are needed are apparatus and methods to circumvent these locks to allow the proper installation and operation of the subject software.

What is further needed is a software solution to make an older processor indistinguishable from a newer processor or a CPU upgrade to substantially all software accessed thereby, providing the same features and functionality.

What is further needed is a method to effectively "weld" such a software solution to an older processor, in order to mediate and monitor all access and use of the processor.

What is further needed is a system and method for preventing and defeating the installation of unwarranted, unwanted, or undesirable software executables and data structures on computers of users. Defeating cookies, reporters, and moles may be a high priority for various parties owning sensitive proprietary information.

BRIEF SUMMARY AND OBJECTS OF THE INVENTION

In view of the foregoing, it is a primary object of the present invention to provide a method and process for improving products, and particularly computer-related products by independent third parties. In certain embodiments, apparatus and methods in accordance with the invention may include obtaining a product from a vendor and testing the product for functionality and for defects in operation. Evaluation, after finding a defect, may include testing to determine a source for defects located in the product. Thereafter, a testing regimen may be developed to instances of the product containing the defect or fault.

Consistent with the foregoing objects, and in accordance with the invention as embodied and broadly described herein, a method and apparatus are disclosed. Certain embodiments of apparatus and methods in accordance with the invention may include solutions to hardware defects, software defects, or both. In certain embodiments, a method and apparatus in accordance with the invention may provide solutions in hardware or software effective to return a defective part to service, in order to serve without having the defect, or without having the condition exist giving rise to the defect.

In certain embodiments, the faulty product may be hardware or software. In certain preferred embodiments, the solution to faulty hardware defects may be provided by software configured to override, circumvent, or otherwise avoid states or conditions of the hardware giving rise to the defect. Thus, the defective operation of the hardware may be avoided by implementation of software in accordance with the invention.

In certain embodiments, a third party may assess a defect and a number of products, or the types of products affected by the defect in manufacturing or design, in order to provide a severity profile reflecting the extent to which the product has been distributed, or to which damage may have occurred to purchasers of the product. A third party, possessing information related to the severity profile corresponding to a defect, as well as methods of testing and optionally curing defects in products, may notify a vendor and develop a liability profile reflecting the extent to which a vendor may be responsible for the defect, with knowledge, or as a result of negligence.

Since some defects may affect the health or lives of persons, liability may be extreme, and may relate primarily to numbers of failures, independent of knowledge. In certain embodiments, a method may include providing a solution to a vendor in order to correct defects in products manufactured and provided by the vendor. Solutions may be selected from modifications to the product, instructions sets provided to a vendor, to a user, or to both, instructing on the steps for curing the defect, or publishing a solution to be implemented by an owner (e.g. user) who has or may purchase the product.

In certain embodiments, solutions may be entitled to intellectual property rights. Similarly, testing processes and methods may be entitled to intellectual property rights. Accordingly, in certain circumstances, it may be appropriate that the process will include obtaining intellectual property rights. Subsequent licensing of intellectual property rights may be directed to purchasers of products or owners of products having a desire to individually license, or may involve licensing to vendors of defective products in order to correct defects in stock or previously sold instances of the product.

In certain circumstances, a third party developer of testing processes and apparatus, or solution apparatus and processes, may take steps to obtain a legal relationship with a vendor, thus imposing a duty on the vendor to the third party. In this manner, a third party provider may become a second party with respect to a vendor as a first party in a legal relationship giving rise to rights and remedies to the formerly third party developer of solutions and testing.

A developer may provide information identifying a defect to a vendor, and, if available, existence of a solution available to the vendor. Thus, a vendor may be motivated to purchase and provide a test to users, or solution. For example, if a vendor cannot solve a problem, and desires only to recall, then a testing regimen may be extremely important. Alternatively, if a solution exists, then a field repair may be executed by a user, by an agent of a vendor, or other entity in accordance with the provided solution. Thus, a vendor may be motivated to provide testing or repairs in order to maintain customer satisfaction. In the event that a vendor is unconvinced of the risk, cost, liability, and so forth of leaving users unsupported against an embedded defect, the developer may demand that a vendor, cure the defect from a position of a legal relationship established as a customer, or the like.

Other systems and methods may provide software and processes to defeat and remedy the harms of invasive software.

In one embodiment, a process may include entering into an agreement and monitoring compliance of a vendor with the agreement in curing defects in accordance with obligations under the agreement. Alternatively, a developer may provide motivation from any suitable quarter including providing motivation to acknowledge and cure defects by taking steps toward obtaining a legal judgment. For example, one may file suit, may provide information to those positioned to file suit, or may take a status placing one in a position to file suit to enforce an agreement, or to motivate a vendor or manufacturer to enter into an agreement.

In certain embodiments, apparatus and methods in accordance with the invention may be embodied in hardware. In other embodiments, solutions may be embodied in software. In certain instances, a defect embodied in the hardware may actually be solved by a solution embodied strictly in software. In this kind of instance, careful programming may be able to circumvent certain activities, by selective execution of test instructions, provision of data, or other activities that may trigger activities by a processor, thereby allowing intervention by software in the originally intended operation of hardware or software. Thus, a problem may actually be solved entirely by an outside software solution. In certain embodiments, a process in accordance with the invention may be embodied in a set of data structures providing operational data, executable data, or both configured in a computer-readable medium to be executable by a processor.

In certain instances, a vendor may acknowledge a problem, yet assert its own ability to detect a defect and cure the defect. In such an instance, a developer may contract with a vendor, causing the vendor to provide an alternative solution, and warrant the validity of the solution to provide a test and warrant the validity of the test. In such an event, a developer may continue to procure and test products provided by the vendor in order to monitor compliance and assure compliance with the agreement.

In certain embodiments, software systems and enforcement methods or remedy methods may be implemented in accordance with the invention in order to defeat invasive software. For example, various methods of uninstalling, publishing warnings, and bypassing invasive software may be implemented by users provided with sophisticated detection and defense software in accordance with the invention. Various approaches to spoof, block, disable, bypass, or otherwise neutralize the effects and functioning of invasive software may be executed in accordance with the invention.

Moreover, reflexive counter measures may also be included such as trapping the invaders who have improperly installed software, overreached in licensing themselves the right to install invasive software, or who have captured through invasive software inappropriate confidential information. In certain circumstances, typically in law enforcement and government agency work where judicial authorization may be obtained, counter-attacking systems may be possible to effectively wiretap or affirmatively attack systems that are collecting or using stolen confidential information.

In addition, processes may include curing the technical defects of software, and legally or administratively remedying the harms perpetrated by such invasive software. Various remedies may include governmental action, individual actions, class actions, shareholder actions, support by skilled counter-invasive software companies, and the like in order to defeat the effects of invasive software. Actions may be direct or indirect by any particular entity intent on remedying the harms caused by invasive software.

In other embodiments, apparatus and methods in accordance with the invention may include a CPU life-extension module that may render a previous CPU indistinguishable from an upgraded CPU to virtually or substantially all operating systems and applications running thereon. Not only may the CPU "appear" to be an upgraded CPU to all software, but the CPU life-extension module may provide the same substantive features and functionality of an upgraded CPU. Thus, the useful life of a CPU may be extended and needless effort and expense may be avoided by the owners and users thereof. In addition, artificial locks and barriers, designed to prevent users from installing and using selected software, may be bypassed.

While some software may utilize newer instructions intended for an upgraded CPU, in many cases, the use of these new instructions may be relatively rare. In some cases, new instructions may only be used to identify and reject "old" processors during installation, and never occur again. In other cases, software may be artificially prevented from running on a particular processor simply due to the lack of a "new" instruction despite the fact that it is not using any of the "new" instructions. In many cases, software, utilizing new instructions may run quite satisfactorily on an older processor if the relatively few newer instructions could be translated into the older processor's native instruction set. Since the new instructions occur relatively infrequently, this translation process may result in very little performance degradation.

Consistent with the foregoing needs, and in accordance with the invention as embodied and broadly described herein, a method and apparatus are disclosed in one embodiment in accordance with the invention as including a processor configured to process data structures comprising executable and operational data. The processor may have a native instruction set that software may use to perform various tasks. A memory device may be operably connected to the processor to store the data structures.

In accordance with the invention, the data structures may include a CPU life-extension module configured to run on the processor and implement new instructions contained in an upgraded CPU's instruction set. The CPU life-extension module may augment the native instruction set of the processor to include additional instructions not previously recognized by the processor.

The CPU life-extension module may be further configured to intervene, when needed, between the processor and data structures processed by the processor, such as applications and the operating system, in order to "appear" to software as an upgraded CPU and to provide the same features and functionality of the upgraded CPU. In certain embodiments, the user may actually be able to choose the extensions to be applied to the CPU. In order to intervene between the processor and the operating system, in certain embodiments, the CPU life-extension module may be installed as a driver. This may allow the CPU life-extension module access to the processor at the highest privilege level.

The processor may be programmed to generate interrupts in response to system faults. The CPU life-extension module may be configured to perform its tasks in response to these interrupts. For example, the CPU life-extension module may be programmed to translate additional instructions, not recognized by the processor, into the processor's native instruction set for processing. This may be accomplished either statically when an application is being loaded or dynamically during execution by responding to an interrupt, generated by the processor, whenever an invalid operation code is encountered. An invalid operation code handler may be invoked that may translate the unrecognized operation code into operation codes recognized by the processor. If the operation code is not recognized by the CPU life-extension module, then the normal invalid operation code procedures may be invoked.

An apparatus and method in accordance with the invention may be programmed to modify system flags to emulate those of an upgraded CPU. For example, a processor may include a flags register containing flags to reflect system status. These flags may indicate whether or not a processor includes various features and functions. The CPU life-extension module may be programmed to detect READ instructions from and WRITE instructions to the flags register and modify the reads and writes to reflect an "extended" flag status corresponding to a CPU in an upgraded state. In certain embodiments, this may be accomplished by maintaining a virtual flags register within the CPU life-extension module.

An apparatus and method in accordance with the invention may configure the processor to generate a stack-fault interrupt whenever the processor pushes data onto the processor's stack. This may be accomplished, in part, by setting the stack size value equal to the address of the current top of the stack. Thus, a stack-fault handler may then be invoked whenever a value is pushed onto the stack. The stack-fault handler may then determine if the operation is pushing values of a flags register onto the stack, and if so, increment the stack size to allow the flags register to be pushed onto the stack, push the flags register onto the stack, and then modify the flag values to emulate those of an upgraded CPU. Thus, in certain embodiments, the modification of the flags register may occur in the copy thereof contained on the stack.

In a similar manner, the stack-fault handler module may be configured to detect future pop operations (e.g. operations pulling values off of the stack), corresponding to push operations (e.g. operations placing values onto the stack), and set breakpoint interrupts to occur in response to the pop operations. A breakpoint handler may then be invoked to decrease the stack size whenever a pop operation occurs. Thus, future push operations will continue to incur a stack-fault interrupt whenever executed. In other embodiments, the stack size may be maintained using approaches such as stack "shadowing", which may maintain a zero-size stack by always invoking a fault handler.

The data structures, in accordance with the present invention, may include an interrupt vector table, having address pointers, used to locate interrupt service routines and fault handlers. The CPU life-extension module may be configured to modify selected address pointers to point to the interrupt handlers and fault handlers used to implement an apparatus and method in accordance with the invention. These may include an invalid operation code handler, stack-fault handler, breakpoint handler, or combinations thereof as needed.

In addition to the foregoing, it is desirable to provide an apparatus and method for circumventing hardware-dependent software installation locks in a computer system. Thus, the useful life of hardware that is artificially excluded from functioning with selected software packages, but in reality is capable and adequate to run the software correctly, may be extended.

An apparatus and method for providing such may include installing a compliant hardware component, such as a compliant CPU, memory module, or disk drive, in a computer system. A compliant hardware component is defined as a component that satisfies the minimum requirements required by the installation routine of a program, operating system, or software package. The installation routine, or program, may abort the installation process of the program, operating system, or software package, if the minimum requirements are not satisfied. For example, a software installation routine or program may require at least a 233 Mhz Pentium processor, at least 128 MB of RAM, and 1 GB of available hard disk space. If these minimum requirements are not satisfied and verifiable by a software installation program, the installation process may be aborted.

Once installation of the subject software package is complete, the compliant hardware component may be removed from the computer system and replaced with a non-compliant hardware component that does not satisfy the minimum requirements of the software package, but is capable of operating correctly with the software package. The software package may then be operated successfully with the supposedly "insufficient" hardware. In certain embodiments, shutting down and rebooting the computer system may be necessary when replacing the hardware. Thus, hardware locks may be circumvented and the useful life of hardware may be extended.

In another embodiment, an apparatus and method in accordance with the invention may be performed in a simulated computer environment, such as with Connectix's Virtual PC or Insignia's SoftPC, in addition to the physical hardware environment hereinbefore discussed. For example, an apparatus and method may include installing a software package in a simulated computer environment, wherein all of the minimum requirements are satisfied in the simulated environment. For example, a simulated environment may provide a sufficient simulated CPU, simulated memory module, and a simulated hard disk, wherein substantially all of the minimum requirements of the software package are satisfied.

Once the software package is installed in the simulated environment, the simulator may be replaced by a simulator that does not satisfy the minimum requirements, but is actually capable of running with the software package correctly and adequately. The software package may then be operated successfully in the supposedly "insufficient" simulated environment. In certain embodiments, shutting down and rebooting the computer system may be necessary when replacing one simulator with another. Thus, as with the physical hardware as discussed hereinbefore, hardware locks may be circumvented and the useful life of simulated hardware may be extended in a simulated environment.

Further details regarding extending the useful life of computer hardware and software can be found in patent application Ser. No. 10/155,284 entitled "CPU Life-Extension Apparatus and Method," filed on May 23, 2002, and in patent application Ser. No. 10/158,353 entitled "Computer Hardware, Life-Extension Apparatus and Method" filed on May 29, 2002, herein incorporated by reference. Further details regarding methods for testing, tracking, and correcting errors due to software and hardware can be found in patent application Ser. No. 09/969,176 entitled "Computerized Product Improvement Apparatus and Method" filed on Oct. 1, 2001, herein incorporated by reference.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 9 is a schematic block diagram of an alternative embodiment of a process for discovering a defect, obtaining a solution, and ultimately enforcing the collection of damages based upon either the damage done prior to repair, the cost of repair, or the like;

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 11, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the processes illustrated in FIGS. 1 through 11 may easily be made without departing from the essential characteristics of the invention. Thus, the following description of FIGS. 1 through 11 is intended only by way of example, and simply illustrates certain presently preferred embodiments of processes that are consistent with the invention as claimed herein.

Figure 1:
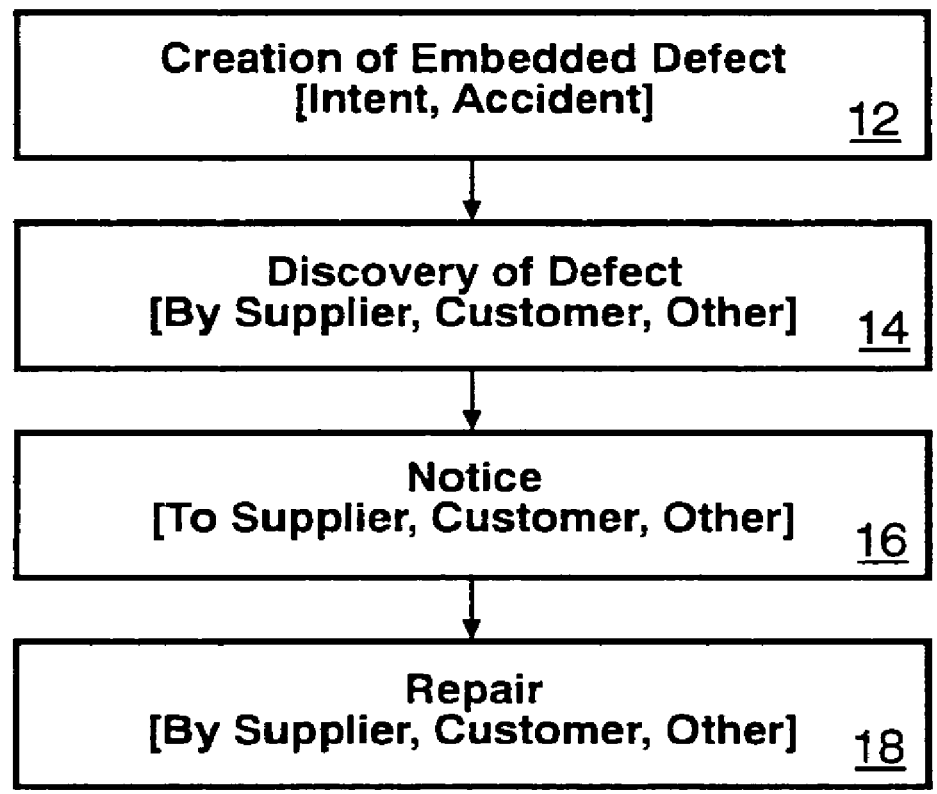
FIG. 1 is a schematic block diagram of a process for discovery, notification, and repair of latent defects whether intentional or accidental in software and hardware products.

Referring to FIG. 1, in one embodiment of a process 10 in accordance with the invention, creation 12 of a defect, which defect may be embedded or latent, such as not to be readily apparent to a user, may be included by accident or by intent in a product. The product may be software or hardware. Typically, a hardware defect may be more difficult to correct. That is, computer code is often changeable, and thus correctable. Often, hardware or firmware coding or other programming may not be so easily changed. In some cases, hardware functions may be very difficult to alter. In other situations, hardware defects may actually be correctable by software fixes created by clever programmers.

Typically, a defect created 12 in a product, and ultimately shipped to customers may not be discovered 14 until such a discovery 14 is occasioned intentionally or accidentally by an expert dealing with the system. In certain circumstances, a defect may be discovered by a supplier. By supplier is meant any party in the supply chain from designer through manufacturer or other producer, to the distribution channels and ultimately the retailer who distributes to a customer. In general, individuals or entities within the supply chain (suppliers) may be considered first parties. Customers or end users may be considered second parties. Third parties may be considered to be those that may or may not be customers, but have occasion to evaluate hardware or software that otherwise passes regularly between first and second parties.

Following discovery 14 of a defect, notice 16 may be provided to an appropriate party. For example, notice may be provided to a supplier that the defect exists. One may note that discovery 14 may occur on behalf of, or by, a supplier, a customer, or another party. Similarly, notice 16 may be provided to a supplier, to a customer, or to another. In one embodiment, a supplier may make the discovery 14, and the notice 16 may be noticed up and down the supply chain to others associated with the supply process. In another embodiment, a third party may effect the discovery 14, and provide notice 16 to an entity in the supply chain.

In some embodiments, a customer may effect the discovery 14 and provide notice 16 to other customers over the Internet on a bulletin board. In some embodiments, a customer effecting discovery 14 may provide notice 16 to a supplier of a defective product. The implication may be that a supplier should repair 18 the defect. Nevertheless, notice 16 may or may not carry an implied or explicit request to repair 18.

In yet another embodiment, a third party may effect the discovery 14 and provide notice 16 to customers, whether or not that third party provides notice 16 to anyone in the supply chain. In this embodiment, a third party may elect to market a solution or provide a solution free of charge over the Internet to interested customers. In certain embodiments, notice 16 may be effected by a third party to customers of a supplier in the hope and expectation of motivating a supplier to effect a repair 18 on its own, as suggested by the third party.

As a general proposition, repair 18 may include any mechanism for effecting a remedy for the creation 12 of a defective product. Repair 18 may include repair of software products or hardware products by a supplier. Repair 18 may be effected by a customer on its own in its own best interest, as a result of notice 16 from anyone who has effected a discovery 14 of such an error and has made known some mechanism for remedying or repairing 18 the problem.

Figure 2:
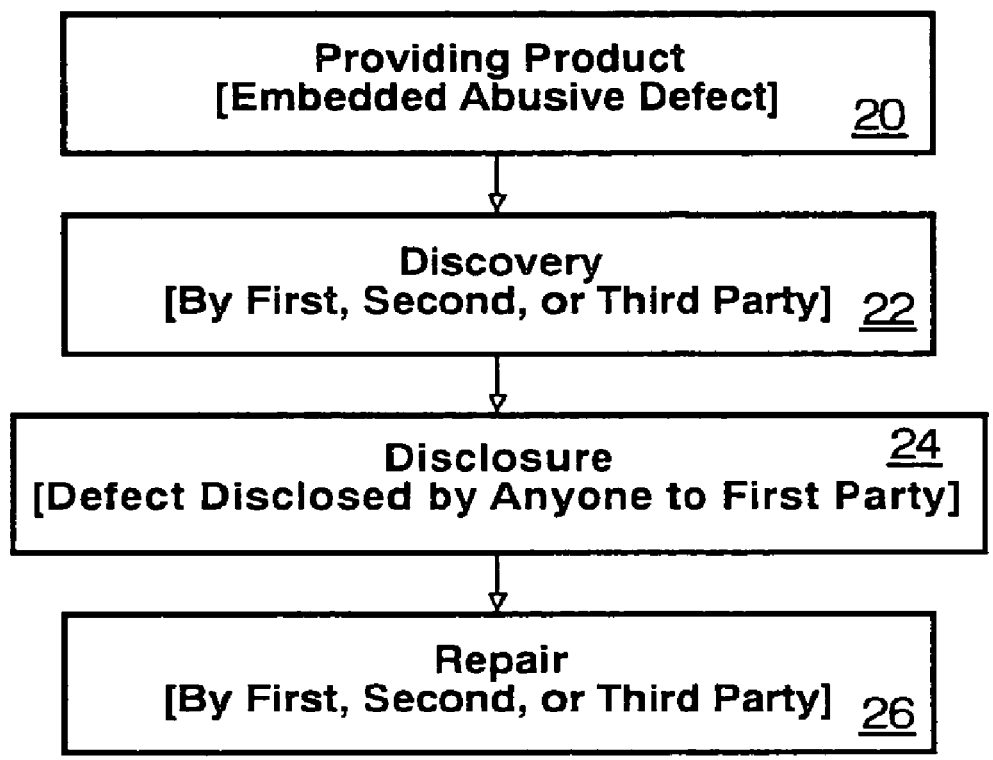
FIG. 2 is a schematic block diagram of an alternative embodiment including a process of discovery, disclosure, and subsequent repair of embedded defects in software or hardware.
Figure 3:
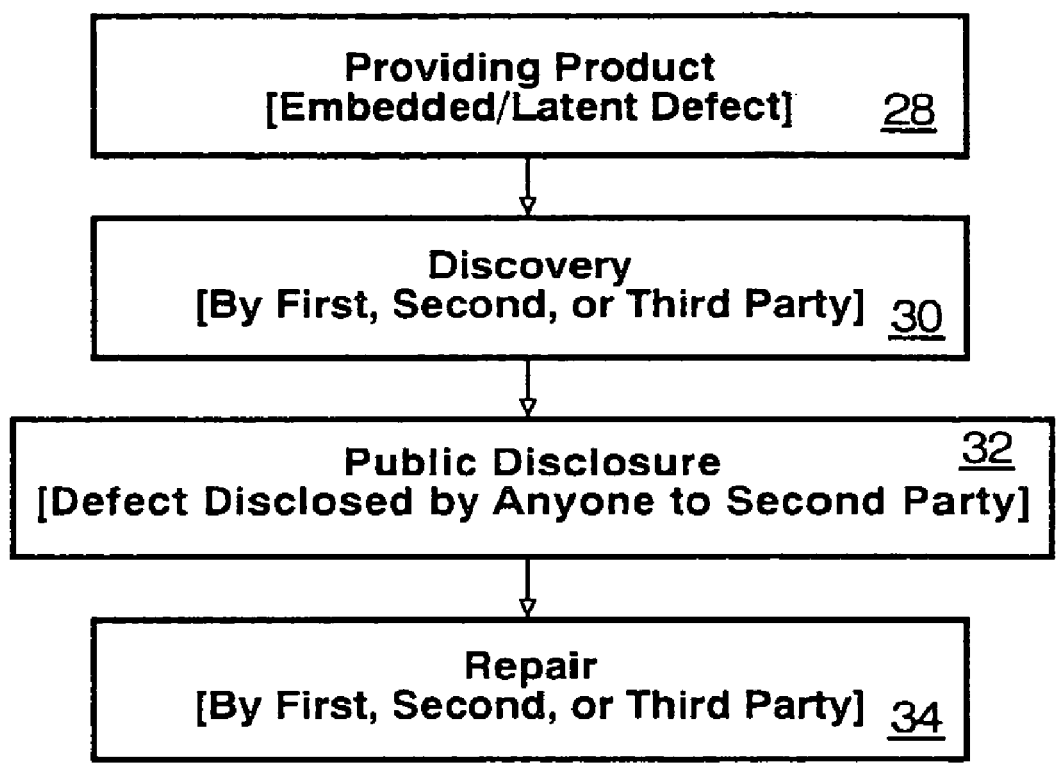
FIG. 3 is a schematic block diagram of an alternative embodiment for public disclosure as a prelude to correction or repair of a defect as in the process of FIG. 2, wherein private disclosure was the only disclosure.

Referring to FIGS. 2 and 3, one embodiment of a process 10 may include providing 20 a product having an embedded defect. The defect may optionally be an embedded abusive defect. Bracketed labels indicate optional steps in the processes discussed herein.

An abusive defect is one that is intentionally inflicted upon a consumer or user. Embedded defects may be hardware or software defects, but typically are known, whether or not intended. In some events, an abusive defect is actually intended. That is, certain hardware is designed to obsolete selected software. Likewise, certain software is designed to obsolete complementary hardware. In other situations, software or hardware is meant to obsolete itself. That is, software or hardware may be provided with locks, triggers, flags, and the like that may deny proper operation of the product with complementary products.

For example, software or hardware may detect implementation with an upgraded version of complementary hardware or software. Accordingly, a self-obsoleting product may refuse to install, load, or run either itself, or the complementary product with which it is expected to operate. Accordingly, a user may be required to upgrade either the product itself, the complementary product associated therewith, or both. Many of the locks and gates embedded into software and hardware may be entirely artificial, and intentionally so. Accordingly, such systems constitute abusive defects.

An abusive defect typically arises in the form of an artificial technical barrier to installation, operation, forward and backward compatibility, documentation, and the like, of a software or hardware product. In general, artificial technical barriers defeat typical users, requiring them to spend more money to buy upgraded software, hardware, or both.

Collaborative obsolescence may involve manufacturers of software and hardware each promoting the other's upgraded products, and requiring limitations that are synthetically imposed in order to promote their own products or the complementary products.

In general, providing 20 a product, having an embedded defect, which may be an abusive defect, may ultimately result in discovery 22 by the first party (e.g. supply chain) by virtue of intent or by virtue of discovery 22 of a defect. Typically, a second party (e.g. customer, user) discovers 22 the defect and notifies the first party. In certain circumstances, a third party researcher or testing agency may effect discovery 22 of a product defect.

Accordingly, disclosure 24 of a defect may be made by the discoverer to a first party. In general, disclosure 24 may be to any party. However, in one contemplated embodiment, disclosure 24 is to a first party by one who has made the discovery 22. In one embodiment immediately contemplated, a third party testing the provided product 20 may make both the discovery 22 and the disclosure 24. In such an event, disclosure 24 is typically made to the first party (e.g. manufacturer, supplier, etc.). Nevertheless, disclosure 24 to a user or other party affected may be an effective way to encourage prompt repair 26.

Repair 26 may be executed by a first party of the supply chain as a public service, as a result of embarrassment, as a result of threats, or the like. Similarly, if repair 26 is not overly difficult, a second party (e.g. user, customer, etc.) may be able to effect the repair 26 by virtue of knowing about the defect. In other embodiments, a first or third party may provide to a second party the information required to effect repair 26. In certain embodiments currently contemplated, a repair 34 may be effected by a first party as a result of pressure, such as disclosure 32 by a third party to the user's and consumer's second party. In another embodiment, repair 34 is effected by a first party, using a solution created by a third party, and presented to a first party. In such an embodiment, a second party may or may not learn of the defect from a third party.

Figure 4:
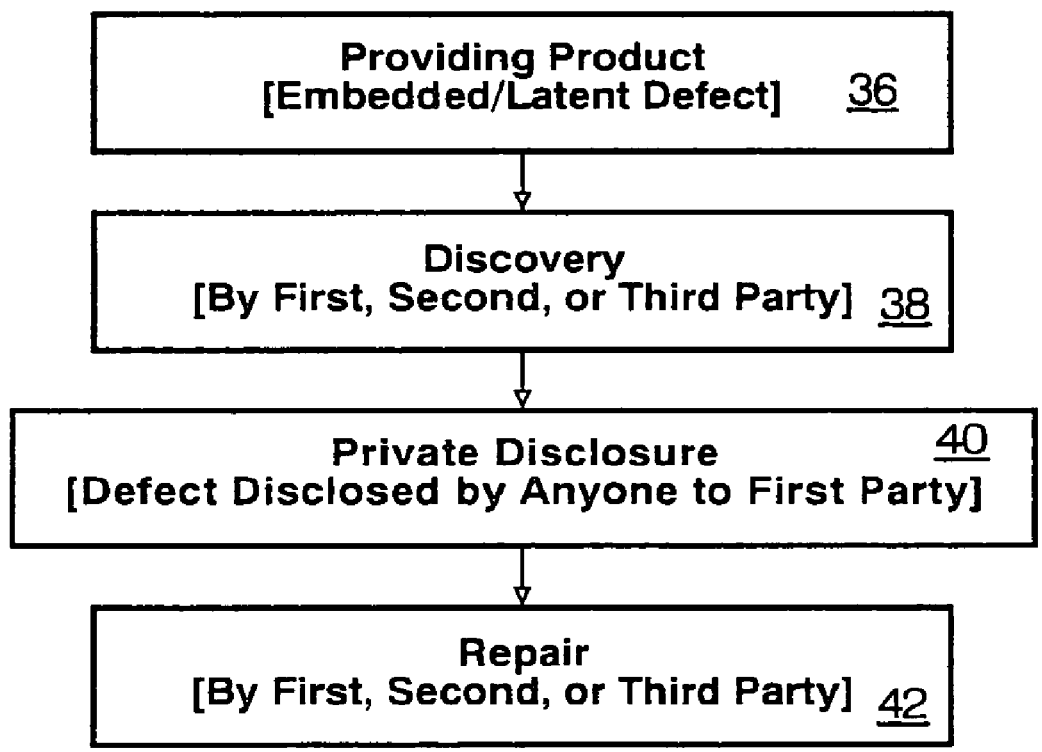
FIG. 4 is a schematic block diagram of a process for discovery and private disclosure of a latent defect embedded in a product.

Referring to FIG. 4, a system 10 or process 10 may include providing 36 a product having an embedded defect or latent defect not readily observable to a user. Discovery 38 may be effected by any party. That is, in general, first parties exist in the supply chain from design through retail distribution, second parties involved users and those associated therewith, and third parties represent those that are privy to errors by virtue of study, research, testing, or the like, whether or not those third parties may be classified also as second parties by virtue of having purchased a provided product 36.

In general, private disclosure 40 represents a substantially different or more specific disclosure 40. That is, a private disclosure 40 may be effected to a first party in an attempt to motivate or allow a first party to repair 42 the defect. Whether or not the defect is intentional, done with knowledge, done by negligence, done by failure of testing, or resulted from an accident in spite of all diligence, the repair 42 is a favorable event. The repair 42 may vary in consequence from absolutely critical to merely convenient.

In some embodiments, repair 42 may be absolutely required in the mind of any second party using the software or hardware having the defect. For example, if a defect involves an insidious corruption of data, without leaving a record or means for detecting the corruption, then much data could be lost, money could be wasted, and havoc could be inflicted, at a much later date, and unbeknownst to those operating a hardware or software system with such a defect. Accordingly, repair 42 may be very important.

Again, repair may be effected optionally by a first party, in one contemplated embodiment, as a result of a private disclosure 40. If a private disclosure 40 results in implementation of a "fix" sent out to all users and purchasers, then the repair 42 may be effected by a second party, or a third party hired to maintain a computer or system. In another embodiment, the repair 42 may be effected as a product provided by a third party as a public service, or profit, or the like.

In FIG. 4, the private disclosure 40 may be a private disclosure to a second party. However, in general, a private disclosure to a first party is likely to be most effective in order to obtain implementation across an entire customer base of a product. The next most effective action may be a public disclosure to second parties who are dependant upon a product that has been found defective.

Figure 5:
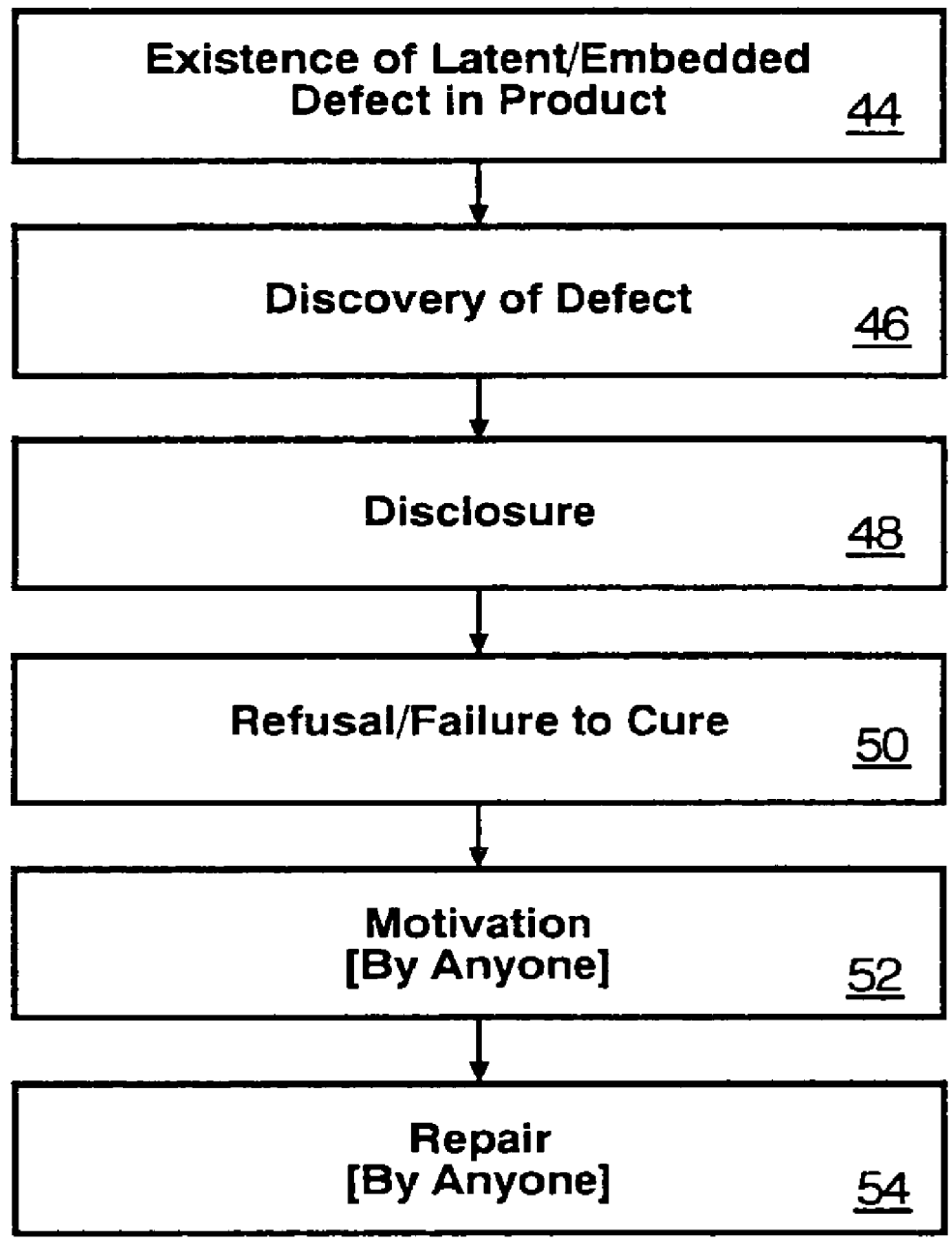
FIG. 5 is a schematic block diagram of an embodiment of a motivational process for discovery, disclosure, and motivation of a producer or supplier to repair or correct a latent defect embedded in a software or hardware product.

Referring to FIG. 5, existence 44 of a defect in a product may arise in the design process, during manufacturing, during production, or as a result of certain choices made upon installation or during operation of the product. Accordingly, existence 44 of a defect may actually occur at any time in the life cycle of a product. Accordingly, existence 44 of a latent defect embedded in a product need not be the fault of any party. The existence 44 may have come about intentionally, as a result of a single party, as a result of multiple parties, as a result of any number of operations by any number of parties, or the like. Accordingly, the existence 44 of a defect that is embedded or latent (indicating that it is not readily apparent, and is more or less an artifact that will continue to exist and not cure itself) may arise from any source.

Discovery 46 again may be effected by any party, but is typically something that will occur as a result of a perspicacious third party. In certain circumstances, nevertheless, discovery 46 is effected by a first party. Many times, discovery 46 by a first party is not acknowledged until a third party brings the defect to the attention of either the public and second parties using the product, or by bringing the defects to the attention of the first party who may or may not already know about them.

Similarly, disclosure 48 may involve disclosure to any appropriate party. Nevertheless, ultimately, disclosure 48 leads to a refusal 50 or a failure 50 of the first party (e.g. supply chain) to cure the defect. Accordingly, as detailed in the patent applications incorporated herein by reference, motivations 52 may include a variety of steps and actions taken by a variety of persons or entities. Accordingly, in certain embodiments, or optionally, motivation 52 may be provided by anyone.

Nevertheless, typically, motivation 52 is provided by interested third parties responsible for discovery 46 and possibly disclosure 48. A refusal 50, or failure 50, to implement a cure for the defect, typically creates a conflict. Motivation 52 may be by means of economic, legal, pubic relations, reputation, or other valued resource. That is, a company may refuse 50 to cure a defect, thinking that the defect is not widespread, or not likely to become a source of public concern.

By the same token, the public relations campaign notifying second parties and the public at large of the defect may provide much motivation 52. Likewise, legal action against a first party on behalf of second parties, or simply on behalf of the public may provide motivation 52. Ultimately, repair 54 consequent to motivation 52 is a unique feature of the process 10 or method 10 of FIG. 5.

In certain embodiments, repair 54 may be effected by a manufacturer or other party in the supply chain. In one typical embodiment, discovery 46 is effected by a third party, disclosure 48 is effected by the third party, refusal 50 occurs by a first party, motivation 52 occurs at the behest of the third party on behalf of second parties, and repair 54 is effected by the first party as a result of the motivation 52 directly. Motivation 52 by way of a class action or a derivative suit may be effected to get the attention of management that has refused 50 to cure a known defect in hardware or software. In another contemplated embodiment, repair 54 may be effected by a third party as a commercial enterprise. Repair 54 may be presented at the time of disclosure 48 in order to leave a first party with no excuse for a refusal or failure to cure 50.

Figure 6:
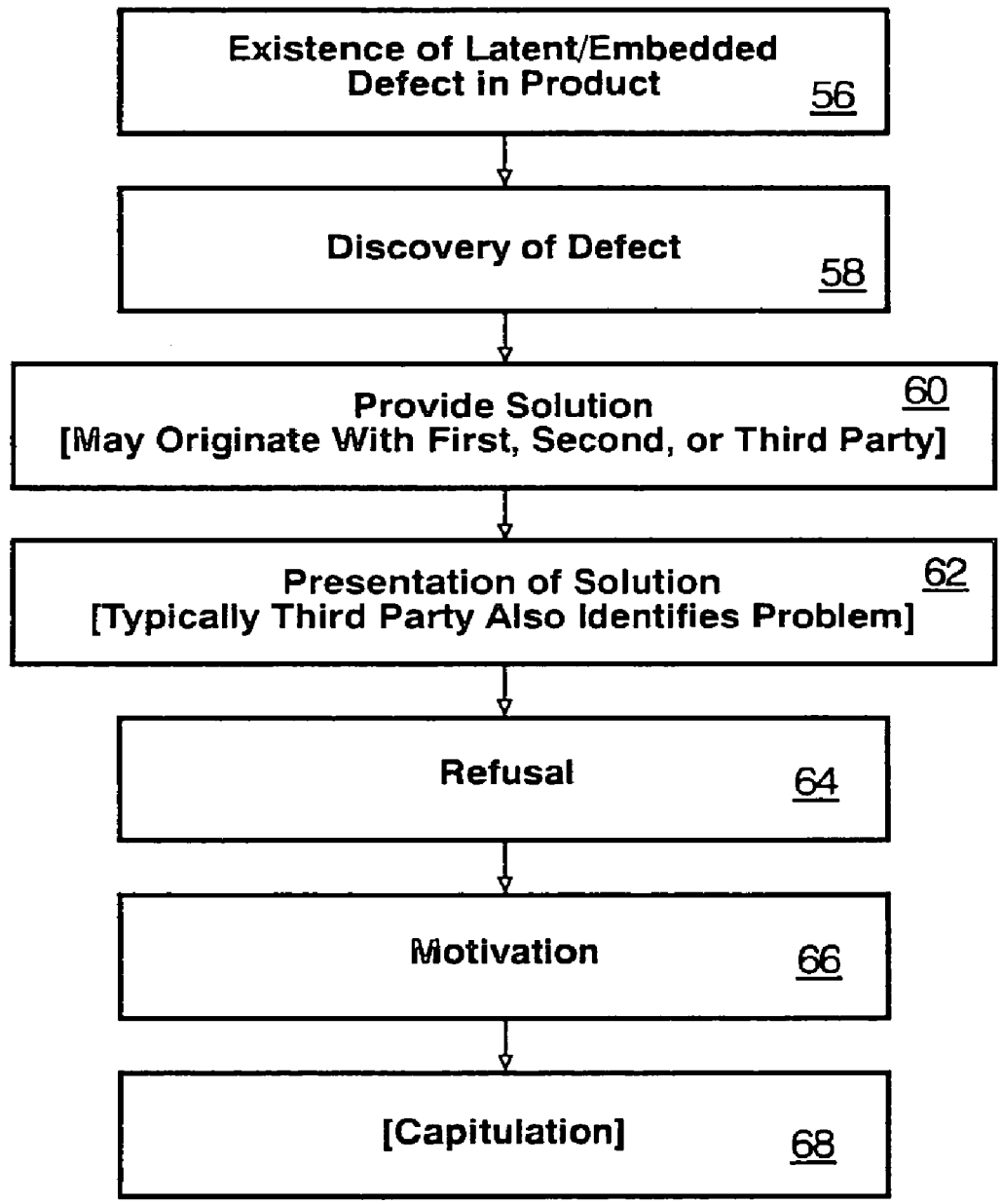
FIG. 6 is a schematic block diagram of an alternative embodiment for discovering a defect, providing a solution, and presenting that solution to a manufacturer or other supplier of a defective product for correction.

Referring to FIG. 6, existence 56 of a defect in a product may result in discovery 58. Ultimately, discovery 58 may not be sufficient to cure a defect. That is, a defect 58 may be pervasive or otherwise so thoroughly embedded, that a solution is not readily available. In certain embodiments, a hardware defect may not be easily repaired in existing machines. For example, curing a defect in existing hardware is sometimes virtually impossible. Future revisions or versions of the hardware may be produced without the defect, but in computer systems particularly, an installed base may become very large by the time a defect has been discovered 58. Accordingly, discovery 58 may not be sufficient to cure a defect. In many instances, simple discovery 58 renders the solution obvious. In many other instances, discovery 58 simply points out the problem, and a cure is not readily available. In such instances, providing 60 a solution to cure the defect discovered 58 may be a comparatively more important than other steps.

Sometimes, an error may not be corrected for the simple reason that repair is so catastrophic. Devastating effects of correction, along with the attendant admissions, may create a barrier to correction by suppliers. Likewise, a denial that a problem exists, or ignoring a problem, may stifle attempts at providing 60 a solution. Therefore, providing 60 a solution to cure the defect that exists 56 in a hardware or software system may originate with a supplier, a user or customer, or with a third party. Nevertheless, solutions typically may originate with a third party having a penetrating ability and interest in a product. Similarly, a knowledgeable and esoteric user may provide 60 a solution from a vantage point of a second party deeply involved in a particularly relevant activity. The relevant activity may tend to provide discovery 58 of the defect or provision 60 of a solution.

Presentation 62 of a solution is typically done with identification of a problem to a first party in the supply chain. Presentation 62 may occur by way of a bulletin board or other campaign between second parties. Nevertheless, presentation 62 of a solution may typically be expected in certain presently contemplated embodiments as a third party's attempt to obtain implementation of a repair or cure by a first party. In the process of FIG. 5, motivation may be as direct as making a first party aware of consequences during the disclosure 48. Accordingly, the process of FIG. 5 may be adequate.

However, in the process of FIG. 6, a refusal 64 and motivation 66 may continue and may escalate indefinitely. In one option, capitulation 68 results in either a repair 54 by a first party, providing 60 a solution to second parties, or simply some cooperative effort in order to provide 60 the solution to all interested parties. That is, capitulation 68 may result from defeat at law, concession as a result of substantial evidence of the defect, substantial advocacy demonstrated for the solution, or substantial risk articulated and identified for a first party who continues a refusal 64 to execute repair.

Figure 7:
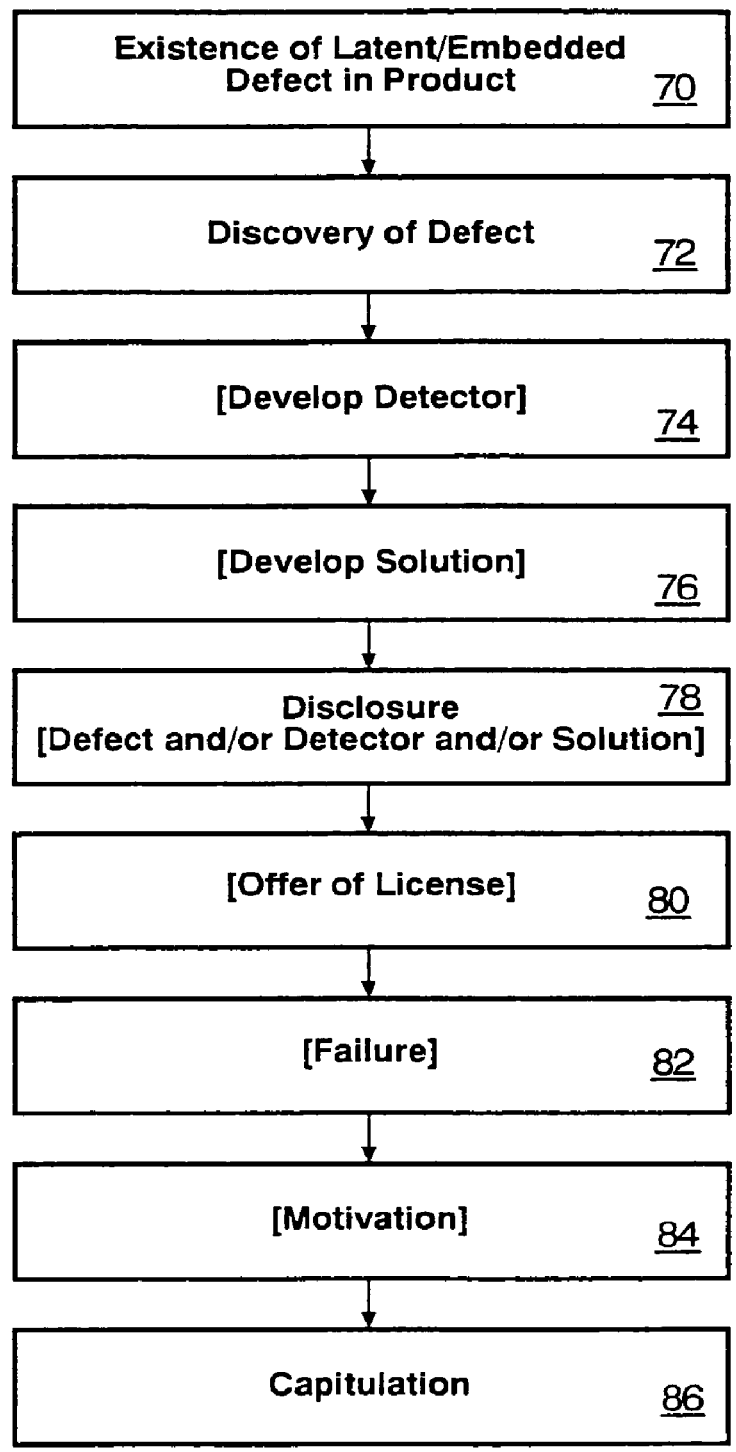
FIG. 7 is a schematic block diagram of an alternative embodiment of a process for discovering a latent defect invented in a product, optionally developing a detector for identifying defective products extant, optionally developing a solution for the defect, followed by disclosure and licensing of the solution.

Referring to FIG. 7, existence 70 of a latent or embedded defect in a software or hardware product may arise from any reason, at any time in the life cycle of a product. The existence 70 may or may not be the fault or intent of any party, and may or may not be a result of accident, negligence, knowledge, ignoring knowledge, or even intent. Nevertheless, discovery 72 occurs by way of a first, second, or third party. Accordingly, optional steps may include developing 74 a detector and developing 76 a solution.

That is, development 74 of a detector usually indicates that the defect discovered 72 may not be easily identified absent some mechanism for determining, on a case-by-case basis, the presence or absence of a defect. Accordingly, development 74 of a detector that is capable of determining, for any particular product or particular instance of a product, whether or not that particular instance of product is subject to the defect, may be a very important step. Just as discussed hereinabove, discovery 72 is sometimes sufficient to imply a cure or even to make the cure a trivial step. By contrast, in some embodiments, development 74 of a mechanism for detecting the defect may be a major task.

Similarly, development 76 of a solution may also be an undertaking of significant substance. For example, if a problem exists in hardware, and the hardware is already committed to a foundry, or an installed base of such products exists, then development 76 of a solution for fixing existing hardware might best not begin with hardware. That is, repairing new hardware, or changing a design so new hardware lacks the defect, is only one part of solving a problem. Curing an installed base having an irretrievable defect is a significant task. Accordingly, development 76 of a solution for a software cure to a hardware problem, or a software cure to a software problem, may be no small task. Likewise, development 76 may have to work around the intentional or accidental defects created by programming on behalf of first parties (supply chain).

Disclosure 78 may include one or more of the defect, a detector, and a solution. That is, one or more may be available and known and thus capable of disclosure 78. In other embodiments, more than one may be available for disclosure 78. In certain embodiments, all may be available for disclosure 78. Accordingly, an offer 80 to license either the detector or the solution, or both, may be tendered. An offer 80 may include an actual proposal of a license, or merely an oral statement to the effect that either a detector or a solution is available in order to effect eradication of the defect.

Optionally, a failure 82 of a first party to effect a cure or repair of the defect may or may not occur. Failures 82 have been discussed in other embodiments, and may be the same here, but may not exist at all. Likewise, motivation 84 may optionally be provided, by any of the mechanisms identified herein or by any of the mechanisms described in the references incorporated herein by reference. Ultimately, however, the offer 80 may be accepted, avoided, or otherwise dealt with in some mechanism for capitulation 86.

In one mode of capitulation 86, the offer 80 may still be refused in favor of an alternative solution by a first party. Nevertheless, capitulation 86 implies capitulation to take steps to remedy the defect in new products sold, in an old installed base of products, or both. Capitulation 86 may or may not involve acceptance of the offer 80 of a license. Again, herein, bracketed labels indicate optional steps. Accordingly, in one embodiment, discovery 72, development 74 of a detector, development 76 of a solution, disclosure 78 of either the detector or solution, and capitulation 86, may be a completely tractable embodiment of the process 10 in accordance with the invention.

Similarly, discovery 72, and development 74, 76, to the exclusion of the other development 76, 74, followed by disclosure 78 and capitulation 86, may again be a contemplated embodiment of the process 10. In other embodiments, both the developments 74, 76 and the disclosure 78, as well as an offer 80, with or without the failure 82 and motivation 84, may result in capitulation 86. In any event, all of the foregoing embodiments, and their optional steps fall within the contemplated embodiments of a process 10 in accordance with the invention.

Figure 8:
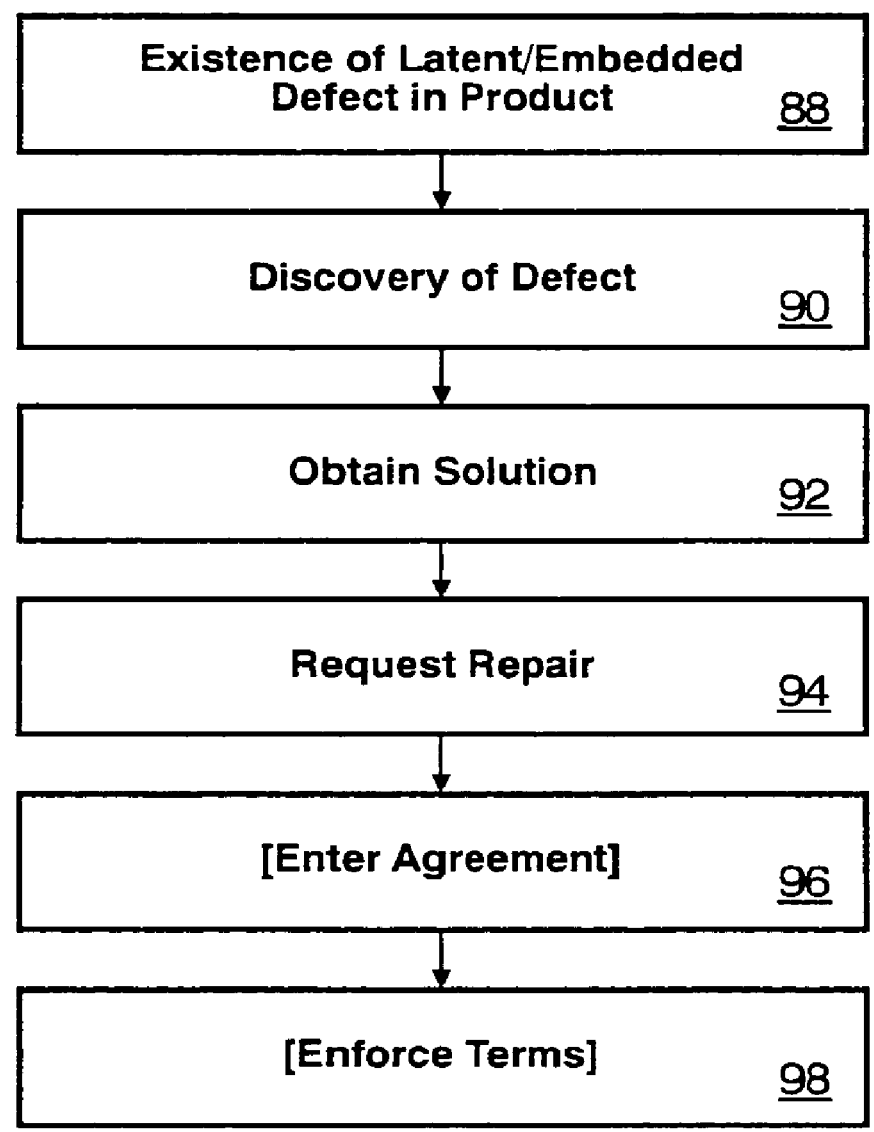
FIG. 8 is a schematic block diagram of an alternative embodiment of a process for discovering a defect, obtaining a solution, or developing a solution obtained from another party, and ultimately entering into an agreement and enforcing the terms thereof in order to obtain requested repairs in defective products, whether hardware or software.

Referring to FIG. 8, one embodiment of a process 10 in accordance with the invention may involve existence 88 of a defect embedded or latent within a hardware or software product. Discovery 90 of that defect may result in any intervening step required in order to obtain 92 a solution. Again, obtaining 92 a solution may be executed by any party whether a first (supplier), a second (user, customer), or a third (independent developer, tester, etc.) party. Obtaining 92 a solution may involve obtaining rights to a solution, or simply obtaining knowledge of a solution. Accordingly, obtaining 92 a solution has at its core an ability to request 94 a repair.

For example, a second party may obtain 92 knowledge of a solution. Accordingly, a second party may make a request 94 upon a first party to effect a repair. That is, a user, for example, may request that a solution obtained 92, or about which knowledge has been obtained 92, be implemented according to the request 94. Any failure by a first party to comply with the request 94 may be followed up with any appropriate action.

Ultimately, however, an agreement is entered into 96. Accordingly, enforcing 98 the terms of the agreement entered into 96 is typically a consequence for an accession by a first party to a request 94. In one contemplated embodiment in accordance with FIG. 8, an agreement 96 may be quite specific in its terms, requiring certain performance parameters, lack of infringement, and the like, in order to effect a suitable repair 26. One will note that each individual Figure contains all new reference numbers, although like process steps may be numbered alike, and similarly named steps may be embodied in accordance with similar or identical features.

Entering 96 into an agreement may or may not be required. That is, in some embodiments, a request 94 may result in immediate capitulation by a grateful first party only to have to economically implement a solution 92 obtained elsewhere by someone else. Similarly, a solution obtained 82 by a first party by any mechanism may be gladly implemented by a first party as a benefit to both the supply chain and to customers, or second parties in general. Nevertheless, in certain contemplated embodiments, the optional entering 96 into an agreement and enforcing 98 the terms thereof may be very useful steps in order to assure that the solution obtained 92 is properly implemented, in that customers and developers receive the benefits of having obtained 92 the solution from the suppliers.

Figure 9:
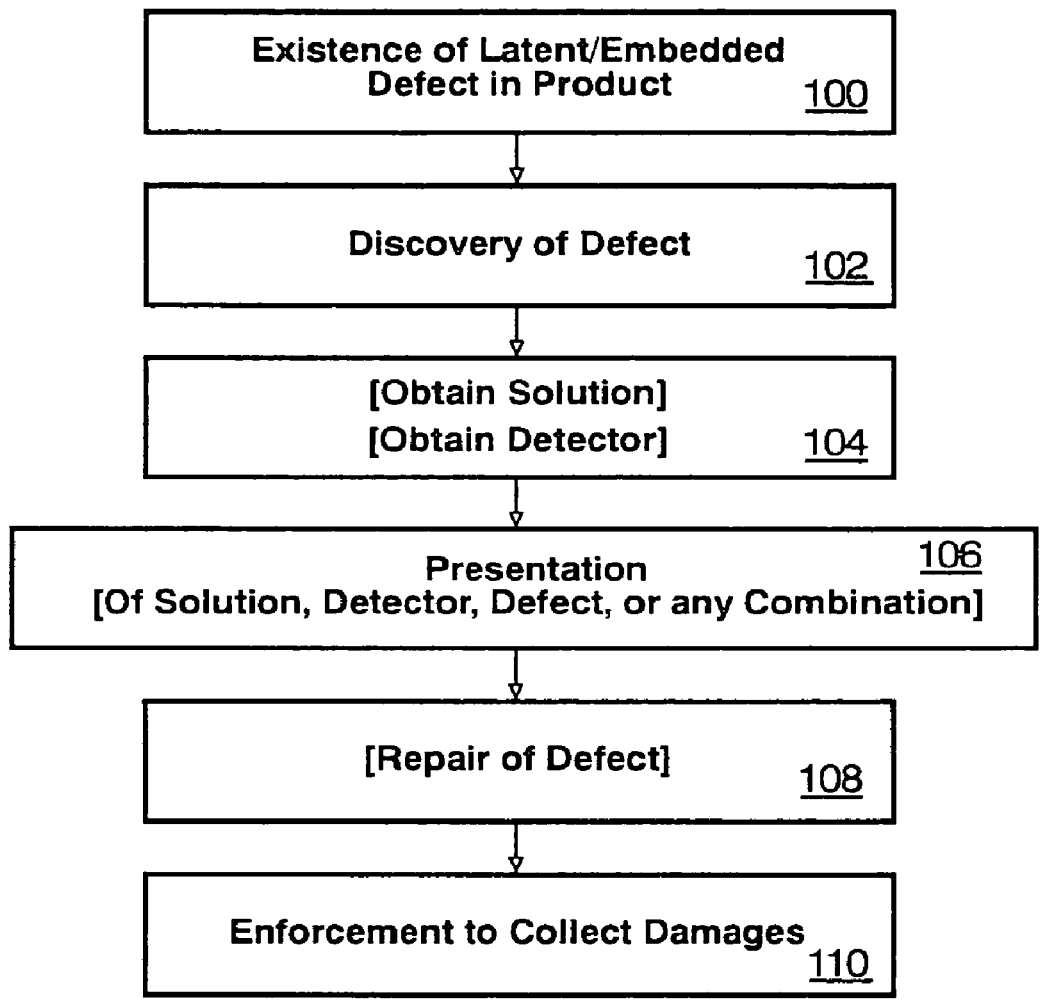

Referring to FIG. 9, existence 100 of a latent or embedded defect in a product, followed by a suitable discovery 102, and obtaining 104 a solution, which solution may include a detector, a "fix," or simply an identification of the problem, the solution of which may be obvious, may all be done in accordance with the foregoing embodiments. Likewise, presentation 106 of a solution may be executed by, to, or both, any party identified hereinabove. Similarly, repair 108 may be effected in any means discussed hereinabove. However, enforcement 110 to collect damages may occur as a direct result of any of the foregoing steps, or the failure thereof to obtain.

For example, if repair 108 is delayed unnecessarily, or if the presence of the defect is intentional and is delayed, or, if the discovery 102 having been included in a presentation 106 is kept from stockholders, users and other second parties, or the like, then damages may result. Accordingly, a derivative suit by first party shareholders owning the company, and thus being technically in the supply chain, against others in the supply chain who have been remiss in their duties, may be an appropriate embodiment contemplated herein.

Similarly, enforcement by second parties such as users and other customers may be appropriate with respect to negligent, recalcitrant, or nefarious first parties who have allowed the existence 100 of a notorious defect. Damages that may be subject to enforcement 110 may arise from direct or consequential costs, and may be added upon and multiplied in accordance with intent, egregious behavior, the extent of knowledge, the pervasiveness of knowledge, the level of denial or intransigence, and the like. Thus, enforcement 110 may include any and all processes available through law, equity, public relations, negotiations, or the like in order to obtain a damages settlement as a result of a defect that has been found to harm users.

Accordingly, repair may be replacement of a product, repair of a defect, correction of a defect, correction of an intentional limiting feature, or the like. Similarly, presentation 106 may include the presentation of the defect, a detector, a solution, or any combination thereof. Similarly, the repair 108 may or may not be effected at all prior to enforcement 110. Enforcement to collect damages 110 may be independent of the availability of a repair or obtaining 104 a solution.

Certainly, a case would appear to be more compelling in the situation where a solution, detector, or both have been obtained 104 and presented 106. Thus, for example, it would appear that a first party (a supplier) would be without excuse, having a reasonable mechanism to effect repair 108. Nevertheless, past damages may be consequential, and defects may have been intentional, or as a result of negligence. Similarly, defects may have been permitted to persist over time, with knowledge, even though originally arising out of an accidental error. Accordingly, certain permutations and combinations of the steps available in the process 10 of FIG. 9 may be combined to ultimately justify an action in enforcement 110 in order to claim damages.

Figure 10:
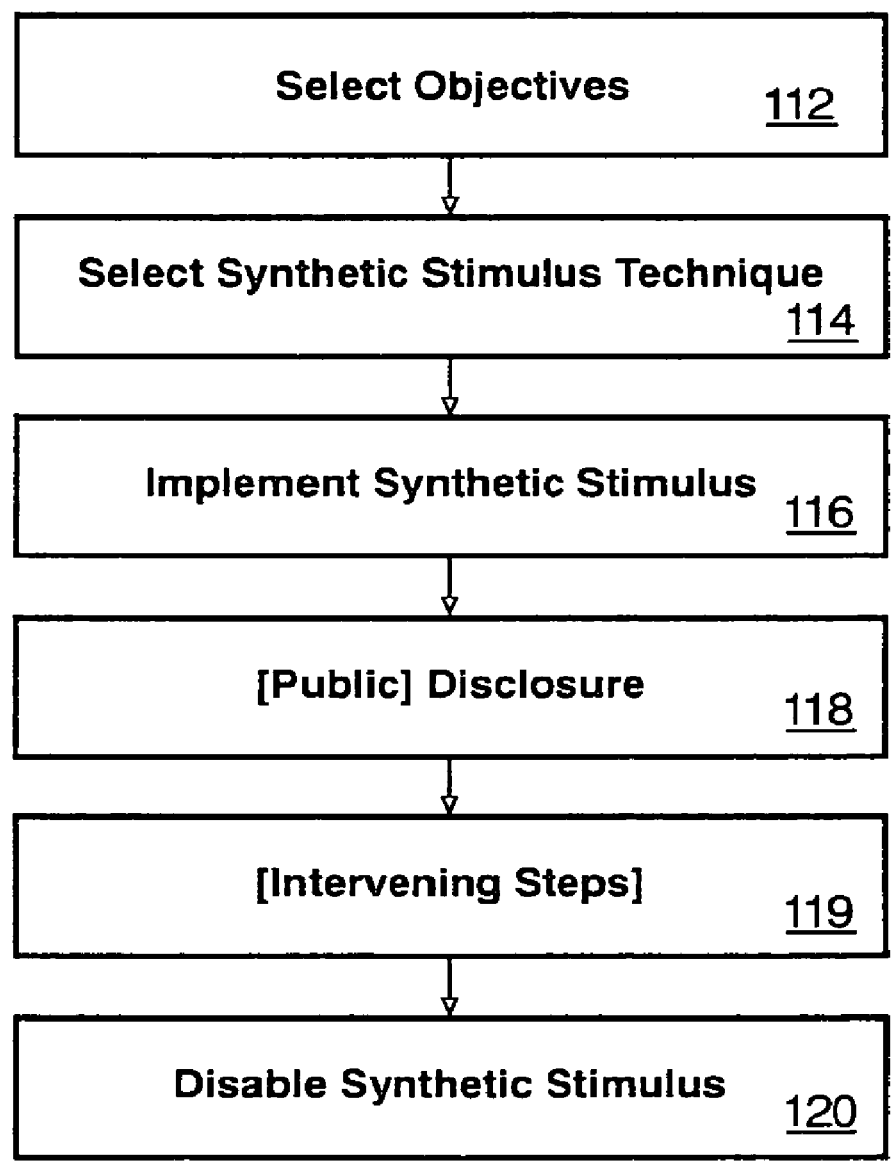
FIG. 10 is a schematic block diagram of a process for disabling a synthetic stimulus embedded in a product, whether hardware or software, in order to correct a product that may be created to prematurely obsolete itself or a complementary product with which it operates.

Referring to FIG. 10, a process 111 in accordance with the invention may actually involve multiple parties. That is, first (suppliers), second (consumers, users, etc.), and third (independent testers, developers, etc.) parties may execute certain of the steps of the process 111 knowingly, intentionally, or even unwittingly, in order to participate or otherwise effect the overall process 111.

For example, selecting 112 an objective is contemplated as the selecting by a first party, an objective that may be proper or improper from a business perspective. For example, some of the objectives may be to increase sales, profit, percent of profit margin, overall gross profit, or gross sales. Similarly, an objective selected 112 may include increasing demand for new units over old units, increasing demand for upgrades, or simply increasing the frequency with which the public or other second parties perceive the need for upgrades. Similarly, a first party in the supply chain may desire to increase the price or profit, or decrease costs, of a manufactured unit. Similarly, a first party may desire to decrease investment in a product, in a product line, or in development of products. Certain first parties may desire to cripple competitors or to advance their own market share at the expense of other suppliers. Selecting 112 an objective may or may not involve proper or improper business methods and business purposes.

Selecting 112 an objective may be followed by selecting 114 a synthetic stimulus technique. Synthetic stimulus techniques are defined in contrast to natural stimulus techniques. Increasing demand by advertising, increasing demand by adding increased numbers of features, increasing performance, adding functionality, changing appearance, introducing complementary products, or other products that may create a need for an associated product, and the like, are all conventional marketing techniques that legitimately stimulate demand for a product by natural means. That is, the increase of development dollars in product development, or advertising dollars to communicate a message or remind people of a need, or urge individual and entities to act now upon a need, are all considered natural motivation techniques.

Perhaps one of the oldest synthetic stimulation techniques has been the early obsolescence of products. Parts that are designed to wear out early, in order that the overall system life is shortened in accordance therewith, is a synthetic stimulus technique. Typically, a synthetic stimulus technique is inappropriate and improper, and is not to be desired. Nevertheless, to the extent that a first party selects 114 a synthetic stimulus technique, they fall within the bounds of the process 111 contemplated, which process 111 is contemplated to trap those who do use synthetic stimulus techniques.

Synthetic stimulus techniques may include artificial locks that lock out a user, or a system, from operation, installation, or other access to features thereof, or features of a complementary product with which a first product is intended to operate. These artificial locks have been dealt with elsewhere, and discussed at great length in the materials incorporated herein by reference.

Version checking, as a mechanism to fail an installation process, or fail execution processes, as well as hardware version checking or instruction testing, and the like, are often simply artificial techniques or synthetic stimulus techniques forcing early obsolescence on otherwise completely suitable products. By completely suitable is not meant that every feature and every performance advantage is available in the product, but merely that a product is operable and serviceable with respect to the needs of a user without the expenditure of more money or other resources to upgrade hardware, software, or a combination thereof.

Another synthetic stimulus technique may involve withholding instructions. For example, if an instruction is simply not included in a manual available to users or developers, then eventually, a large fraction of users or developers will through ignorance not be able to access the instruction. Accordingly, key instructions that might allow testing or overriding of a limitation synthetically imposed, create an additional barrier to avoiding the synthetic stimulus or synthetic limit.

Typically, a software or hardware vendor may contend that an instruction would confuse or create a security breach in a system. Nevertheless, to the extent that an instruction is withheld in bad faith, it would seem to be a clear implementation 116 of a synthetic stimulus.

In general, implementation 116 of a synthetic stimulus may involve any suitable (whether appropriate or inappropriate) stimulus technique and implementation thereof in hardware, software, or a combination thereof. In certain embodiments, user manuals may be redacted to eliminate certain information. Likewise, instructions may be hidden from a user, developer, or both.

Similarly, pointers may be reset to jump over instructions, thus rendering those instructions unavailable. Similarly, certain execution lines in code may be jumped over and thereby remain inaccessible except through undocumented mechanisms available only to testers under the control of first parties in the supply chain. Likewise, program rejection testing, imposing spurious criteria or "convenient" criteria that greatly inconvenience users but are available to experts, typically associated with first parties, may all be mechanisms for 116 implementing synthetic stimuli.

In general, one may think of implementation 116 of synthetic stimuli or at least a single synthetic stimulus as a mechanism for artificially requiring or artificially consuming resources. For example, a lockout mechanism may require a specific CPU, when software is completely capable of operating on a CPU of less robust or less powerful abilities.

Similarly, a program may refuse to install a software package as a result of some lack of a specified amount of memory, which amount of memory could easily be circumvented, avoided, or otherwise rendered unrequired. Similarly, invasive software routines may be embedded as a mechanism to gain information about a second party, in order to pinpoint target marketing, thus providing a stimulus technique that might otherwise be appropriate, except for the inappropriate and improper obtaining of information invasively without permission.

Disclosure 118 may be public, private, or a combination thereof. Disclosure 118 has been discussed in many ways hereinabove. A disclosure 118 of the existence of a synthetic stimulus may ultimately result in disabling 120 of the synthetic stimulus. The disclosure 118 may be by any party. The disabling 120 may be by any party. In certain embodiments, the disclosure 118 may be by a third party to a first party, by a third party to a second party, by an independent tester or developer to either the customers in the installed base or the possible customer base, or to the first parties who are in the supply chain from the designer, through the manufacturer and down the distribution chain.

Intervening steps between the disclosure 118 and the disabling 120 of the synthetic stimulus may include any or all of the motivation techniques and the enforcement techniques that have been discussed hereinabove. Similarly, all of the materials incorporated herein by reference discuss various techniques whereby motivation may be brought to bear encouraging repair of defects.

In the method 111 of FIG. 10, disabling 120 a synthetic stimulus specifically refers to disabling a synthetic stimulus that was intentionally established, regardless of the intent with respect to the rationale. That is, the synthetic stimulus was implemented intentionally, whether or not the motivation for that stimulus was in good faith, in bad faith, without any degree of mental culpability, or the like. Thus, regardless of what motivations may have been intervening in the process 111 between the disclosure 118 and the disablement 120, steps shown and discussed may optionally be imbedded in the process 111 of FIG. 10. Accordingly, intervening steps 119 may be drawn from any of the processes hereinabove.

Figure 11:
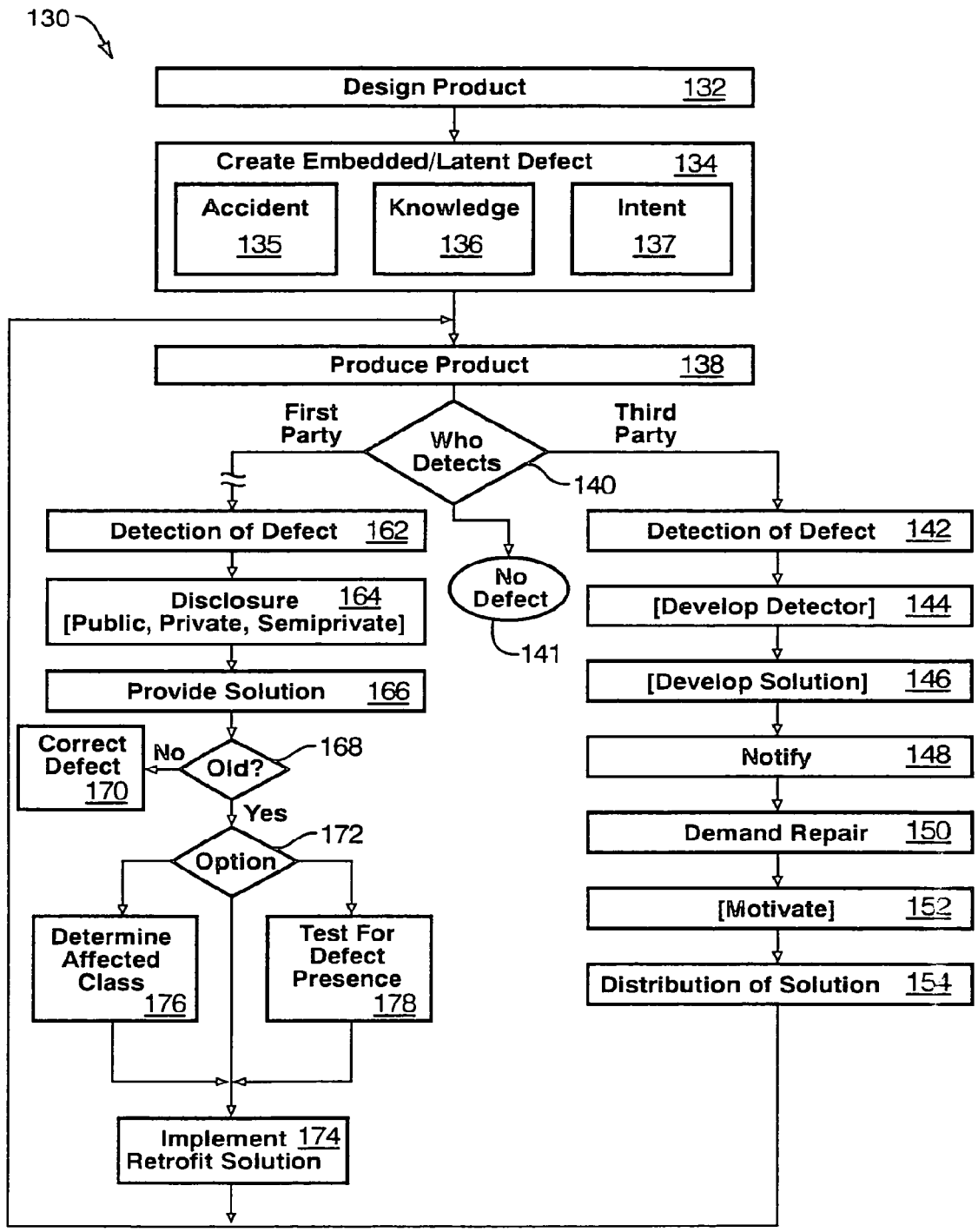
FIG. 11 is a schematic block diagram of a generalized process from design of a product having a defect, whether created accidentally, with knowledge, or with intent, through detection and correction to a substantially defect free status.

Referring to FIG. 11, a process 130 may include design 132 of a product. Design 132 may be done with any degree of good or bad motive, to perform any appropriate function. The design 132 may be a design for hardware, software, or any combination thereof. Ultimately, the design 132 devolves to creation 134 of a defect embedded or latent within a product. Creation may be by accident 135, with knowledge 136, or with intent 137. Knowledge 136 may be a priori, or after the fact. That is, allowing a defect to go forward, knowing that it exists, involves one level of knowledge. Allowing a defect to remain in a product under production, is a different level of knowledge, and requires a different balancing of factors, by comparison with intent 137 in one case, and accident 135 in another case.

Eventually, producing 138 a product can be expected to place a product into the stream of commerce. Products may have defects that are significant, or defects that are insignificant. To the extent that a manufacturer or other in a supply chain is aware of a defect, they may discount the price to make up for the defect, recall a product, correct a defect, or simply change a design and leave an installed base in place. Regardless, producing 138 a product that has a defect that is significant, and that can cause economic damage to a second party (user, customer, etc.) may result in detection by someone.

A test 140 in the process 130 determines who detects a defect. Ultimately, a condition 141 reflecting an absence of a defect is hoped for and aspired to. If a defect is not detected, then the condition 141 is the logical consequence of the test 140 establishing who detects a defect. If a third party detects a defect, then detection 142 occurs on behalf of a third party. For the purpose of this process, a third party may include second parties, although most second parties may be considered only users, and not of the capacity to determine the defect. However, certain second parties (users, customers, etc.) may purchase a product, and in the nature of their work, or their interests, detect 142 the defect. Thus, a distinction between a third party and second party may not exist for practical purposes with respect to detection 142.

Development 144 of a detector may occur on behalf of a second or third party as a result of a detection 142 of a defect. That is, a defect may be detected 142 accidentally, or as a result of certain research. However, developing 144 a detector in accordance with the process 130 involves developing a system that is capable of evaluating other systems arbitrarily, or at random, in order to determine whether or not those systems possess the defect.

Sometimes, the specific manufacturing serial numbers or manufacturing plant name may be enough to identify a system as defective. In other events, only individual testing on individual units can be expected to identify those that are subject to the defect. Accordingly, development 144 of a detector may be a very significant task, and often times will be completed only by a independent third party, or a second party tasked with a detailed knowledge of either testing or operation of a software or hardware product.

Similarly, developing 146 a solution may be optional, and may or may not be undertaken as a result of detection 142. Typically, development 146 may be done by a third party as an economic investment, recognizing the importance of the defect that has been detected 142. Accordingly, a solution developed 146 may actually be for sale or license, whether or not to a first party or broad distribution to an installed base, or to second parties directly by any suitable mechanism.

Eventually, notification 148 or notifying 148 results in knowledge coming to first, second, or both parties. Notification may be effected in any way identified hereinabove, or other appropriate manner as may arise. Ultimately, however, a demand 150 for a repair of the defect may be made by or on behalf of second parties, third parties, or the like. Ultimately, motivating 152 may be required, and may exist in any greater or lesser degree.

That is, for example, motivating 152 may be as simple as including a single statement of the potential consequences of the existence of a detected defect 142. On the other hand, other levels of motivation may require public interest campaigns, lawsuits, shareholder derivative suits, disclosure to shareholders, public relations campaigns, and the like. Sensitivity to consequences, acknowledgment of the gravity of consequences, acceptance of the risk, acceptance of the cost of repair, and the like, ultimately all figure into the tasks, levels, expense, and duration of motivation 152 required.

Ultimately, motivation 152, or simply the demand 150, if readily effected, may result in a distribution 154 of a solution. Accordingly, the process 130 returns back to the production 138 of a product.

If, in response to the test 140, the first party (in supply chain) effects the detection 162 of a defect, then disclosure 164 may be a simple matter of disclosure within the confines of the first party. For example, a manufacturer may notify distributors. Similarly, a first party distributor may notify a first party manufacturer of a defect, as a result of the detection 162 by the distributor. Thus, detection 162 and disclosure 164 may occur up and down the first party distribution chain or supply chain as appropriate. Disclosure 164 may be public, private, or semi-private.

Public disclosure may include posting on bulletin boards or other publicly available locations in order for a defect to be observed and understood by the public-at-large, and specifically second parties. Similarly, a private disclosure may be to a second party, but without great or widespread effect. Semi-private disclosure may be private within certain confines, as among various first parties in the supply chain. A private disclosure may exist between two first parties. Inasmuch as the first parties may not be highly adversarial. Providing 166 a solution may be readily accepted, since no widespread obligation or fault has been identified outside the first party system. Unlike a situation in which a third party may detect 142 and notify 148, disclosure 164 among first parties may not be viewed with alarm, the same degree of alarm, or defensiveness.

By the same token, disclosure 164 to private parties may be augmented by disclosure 164 to public parties, in an effort to assuage damages, or to notify third parties of how to cure the problem. Providing 166 a solution, in other words, may actually be embedded in a disclosure 164 to the extent that a defect is relatively minor. However, it is contemplated that providing 166 a solution may be a major undertaking in many implementations of the process 130 in accordance with the invention. That is, resources may be required to provide 166 a solution, and third parties may be contacted either under contract, or as a result of third party interest or collaboration.

If a product or defect is determined to be or not to be old in a test 168, the process 130 may vary. If the product is not old, then correcting 170 the defect may be a straightforward matter. For example, if the product is still in manufacture or a small installed base exists, then correcting 170 a defect may be relatively simple. Similarly, if the defect is not a major problem, or its correction would not constitute a major investment, or otherwise would not require excessive cost or public relations harm, then correcting 170 a defect may be readily executed by first parties.

However, to the extent that major resources have been installed in reliance on a particular design, such as may occur in hardware manufacture, or to the extent that a large installed base may already exist, then acknowledging the defect may be more difficult. Thus, correcting 170 the defect may involve "eating a lot of crow." Accordingly, parties in the supply chain are sometimes very reluctant to expose themselves to the damage of admitting or identifying a longstanding defect. Accordingly, if the test 168 results in identifying a problem as "old" or "legacy," or existing for a comparatively long time, long enough to engender harm by being raised for correction 170, then a test 172 may result in exercising one of several options.

For example, if it were considered feasible, or if first parties in the supply chain are sufficiently responsible, implementation 174 of a retrofit solution may occur immediately. That is, if the system is old according to the test 168, then the problem becomes not only repairing new systems coming off a production line, but repairing installed base systems. Accordingly, implementation 174 of a retrofit solution implies that installed base systems are being repaired. If a defect is found to affect all systems produced, then implementing a retrofit solution 174 may be the easiest, and perhaps only, reasonable option as a result of the test 172, for distribution.

In the alternative, certain identification processes inherent in disclosure 164 may themselves identify certain classes, such as certain serial numbers, certain manufacturers, certain plants, certain design drawings, and the like, that will identify specific systems by class as having the defect in question. Accordingly, determining from records or other mechanisms important information may allow a determination 176 of an affected class to be retrofitted. Thereafter, implementation 174 of an appropriate retrofit solution may occur.

In yet another embodiment, a test 178 for the presence of the defect may be required in those situations where it is not known which products contain the defect, or the distribution process has become so widespread that the information as to class membership or the origins of the defect cannot be traced back to specific classifications. Accordingly, a test 178 for the defect may be developed and implemented in order to evaluate on a case-by-case basis whether or not a particular system has the subject defect. Thereafter, the test 178, and any other implementation scheme 174 may be executed. Ultimately, the correction 170 of the defect, the implementation 174 of a retrofit solution, or the distribution 154 of a solution may all lead back to producing 138 a product absent the defect, and also a product 138 for curing a defect.

From the above discussion, it will be appreciated that the present invention provides an enforcement process for correction of hardware and software defects. The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for correcting inoperability of components of a computer system, the method comprising:
   identifying a first computer comprising a first processor manufactured in a first, non-upgraded, configuration defining an architecture for a family of computers;
   identifying a second computer comprising a second processor manufactured after the first processor, in a second, upgraded, configuration within the architecture and family of computers;

identifying a first supplier of the first and second processors;

identifying a product, comprising a first software package, provided by a second supplier, specifying operability thereof with the second configuration, and specifying inoperability with the first configuration;

providing a server operably connected to the Internet;

providing a test computer comprising a third processor and controlled by an independent entity, independent from the first and second suppliers;

loading the software package on the test computer;

programming the test computer to run the first software package;

configuring the test computer to correspond to the first configuration;

evaluating, by the test computer, operability of the product on the test computer in the first configuration;

determining, by the test computer, a solution providing operability of the product on the test computer configured with the first configuration;

the determining, further comprising testing the efficacy and operability of at least one of
- providing a second software package, distinct from the first software package,
- providing alternative code to be inserted within the first software package,
- manipulating hardware components, corresponding to the first computer, in the test computer, and
- replacing at least one component, of the test computer and corresponding to the first configuration, without configuring the test computer to the second configuration;

sending by the test computer to the server a specification of the solution; and sending, by the server, notice to at least one other computer connected to the Internet a solution description comprising at least information confirming the existence of the solution providing operability of the product with the first configuration;

identifying, by the server, a legal action available to at least one of the independent entity, the public, and a purchaser of the product, against at least one of the first and second suppliers, to cause implementation of the solution; and sending, by the server, documentation reflecting initiation of a process to implement the legal action.

2. The method of claim 1, further comprising communicating by the server confirmation of the existence and availability of the solution to at least one of a computer controlled and operated by the first supplier, a computer operated and controlled by the second supplier, and a plurality of computers operated by a public party unrelated to the first and second suppliers.

3. The method of claim 2, wherein communicating further comprises presenting at least one of a license and a product embodying the solution.

4. The method of claim 3, wherein the server sends the solution description through a private communication over the Internet.

5. The method of claim 4, wherein the server is controlled by the independent entity.

6. The method of claim 5, wherein the at least one other computer is controlled by a news media entity.

7. The method of claim 1, wherein sending notice further comprises presenting at least one of a license and a product embodying the solution.

8. The method of claim 1, wherein the server sends the solution description through a private communication over the Internet.

9. The method of claim 1, wherein programming the test computer is performed by a third party, independent from the first and second suppliers.

10. The method of claim 1, wherein the server is controlled by the independent entity.

11. The method of claim 1, wherein the at least one other computer is controlled by a news media entity.

12. A method comprising:

accessing the Internet connecting a plurality of computers;

providing a test computer comprising a test processor;

providing a server connected to the Internet and comprising a server processor;

providing a node, comprising a node processor and operably connected to the Internet;

programming the node processor to access information, related to a plurality of available products and available over the Internet;

identifying, by the node, from the plurality of available products, a first product comprising devices available in an earlier, non-upgraded, configuration and a later, upgraded, configuration from a first supplier;

identifying, by the node, a second product comprising software, available from a second supplier and specified by at least one of the first and second suppliers as being operable on those of the devices having the upgraded configuration and inoperable on those of the devices having the non-upgraded configuration;

loading the second product onto the test computer, the test computer being further controlled by an independent entity, independent from the first and second suppliers;

testing, by the test computer the second product for operability thereof with the non-upgraded configuration;

identifying, by the test computer, a basis for the operability of the second product with the test computer in the first configuration;

executing by the test computer the second product without the test computer being in the upgraded configuration;

sending by the server a communication over the Internet describing the existence of the basis of at least one solution for operability;

identifying, by the server, to the second supplier, the at least one solution providing the operability of the second product with the first configuration;

identifying, by the server, a legal action available to at least one of the independent entity, the public, and a purchaser of the second product to cause implementation of the at least one solution; and sending, by the server, documentation reflecting initiation of a process to implement the legal action.

13. The method of claim 12, wherein the at least one solution comprises at least one of software coding and a new configuration distinct from the second configuration, for the first product.

14. The method of claim 13, further comprising verifying by the independent entity the implementation of the at least one solution by the second supplier.

* * * * *